United States Patent [19]
Larroche et al.

[11] 3,800,049
[45] Mar. 26, 1974

[54] PROCESS FOR OBTAINING DRIED FRUITS, ESPECIALLY PRUNES

[76] Inventors: Jean Larroche; Claude Larroche, both of 12 Lamartine, (47), Villeneuve sur Lot, France

[22] Filed: July 27, 1971

[21] Appl. No.: 166,634

[30] Foreign Application Priority Data
July 30, 1970    France .............................. 70.28193
May 13, 1971    France .............................. 71.17370

[52] U.S. Cl.................. 426/305, 426/444, 426/456, 426/506, 426/524, 426/207
[51] Int. Cl............................................... A23b 7/04
[58] Field of Search ............. 99/100, 103, 204, 104, 99/193

[56] References Cited
UNITED STATES PATENTS

| | | | |
|---|---|---|---|
| 3,615,687 | 10/1971 | Mochizuki et al. ................... | 99/100 |
| 3,010,831 | 11/1961 | Rivoche .............................. | 99/204 |
| 2,788,281 | 4/1957 | Guadagni............................ | 99/193 |
| 3,219,461 | 11/1965 | Lamb.................................. | 99/204 |
| 2,865,758 | 12/1958 | Weckel................................ | 99/103 |
| 1,835,237 | 12/1931 | Moore ................................. | 99/104 |
| 1,717,489 | 6/1929 | Barlow................................. | 99/204 |
| 2,618,564 | 11/1952 | Mills et al. ........................... | 99/193 |
| 3,365,309 | 1/1968 | Pader................................... | 99/204 |

*Primary Examiner*—Norman Yudkoff
*Assistant Examiner*—Curtis P. Ribando
*Attorney, Agent, or Firm*—Littlepage, Quaintance, Murphy & Dobyns

[57] ABSTRACT

An improved process for obtaining dried fruit, notably prunes, is described.

The picked fruit is treated, either immediately after having first been subjected to blanching, or a few days after picking and following partial dehydration, or after lengthy preservation. They are subjected to two successive steps: (a) enriching of the fruit by the penetration of its cells by a sugar, sweetening product or other substance enabling the dry extract of the fruit to be increased by osmosis, and (b) dehydration which permits a more or less large amount of the water contained in the fruit cells to be extracted. The invention therefore consists in an enriching of the fruit followed by a dessication.

Said process, applied notably to the Ente plum, enables a larger gauge size prune of improved flavor to be obtained.

1 Claim, No Drawings

PROCESS FOR OBTAINING DRIED FRUITS, ESPECIALLY PRUNES

The invention relates to the food industry, and its object is more particularly an improved process for obtaining dried fruit, notably prunes from all varieties of plums, such as the French Ente plum, damsons and other similar plums.

First, the prior art will be retraced by briefly describing, by way of example, the processes now used to treat the French Ente plum in order to make prunes.

The Ente plum is an oblong, mauve fruit with a characteristic taste. When fresh, and moderately ripe, the fruit has a dry extract level of about 20 to 25 percent. It is a thin-skinned fruit, which enables it to be dehydrated without its becoming enclosed in a tough coat, and consequently to be eaten dried without being peeled.

The Ente plum is picked in France from the 15th August onwards until the end of September or beginning of October.

Harvesting is carried out at optimal conditions of ripeness so as to obtain Ente plums having the highest possible degree of dry extract. The Ente plum is therefore in a state very closely resembling that of alcoholic fermentation and must be processed very rapidly in order to avoid deterioration caused by said fermentation. It is therefore indispensable to subject the Ente plum to a dehydration treatment within a few hours after picking.

However, in certain cases, the fruit is conserved in a cold-storage chamber, but although this process prevents fermentation it cannot prevent the formation of moulds which deteriorate the appearance and quality of the product considerably.

For dehydration, the plums, laid out on wire racks, are placed in dehydration apparatus which operate by the flow of preheated air pulsed through a tunnel-shaped zone.

At the start of dehydration, and in order to avoid the juice running out, the air moisture content is maintained at a fairly high level and the temperature is relatively low (about 50°C).

As the plum moves through the tunnel of the drying apparatus, the humidity is reduced progressively and the temperature raised progressively to 80° to 90°C.

The known drying methods are all substantially the same, but vary slightly according to the particular installations used. The variation lies in the relationship between the lowering of moisture and rise in temperature, and the rapidity of this evolution.

The dehydration treatment is intended to provide at the tunnel outlet a prune having a dry extract level of 78 to 80 percent, to which it has been raised from a starting level of 20–25 percent, owing to the evaporation of the water contained in its cells.

These so-called superdehydrated prunes (at 20 percent to 22 percent moisture content) can be kept in bags with no other protection, their dry extract level being considered as being sufficient to ensure their sterility. Such prunes should, however, be subjected to a further treatment in order to be fit to eat.

Superdehydrated prunes can be kept for one year without danger, but should be retreated before being distributed for consumption and processed according to the following technique, more especially as prunes are sold all the year round.

The prunes are immersed in a bath of water, the temperature of which is maintained as exactly as possible at 80°C. Said temperature of 80°C being the optimal threshold of rehydration without dissolution of the fruit's natural sugars. In fact, a temperature in the neighbourhood of 100°C causes conversion of sugar, and, consequently, a loss of weight. Said immersion should last for between 15 and 30 minutes according to the size of the fruit, the prune is rehydrated, the dry extract level being adjusted to a minimum of 65 percent (or less than 35 percent moisture content).

The fruit is then packed in its sales packing; conservation is ensured by thermal treatment in closed packages, which is carried out either at 85°–90°C in ovens, or under steam pressure at 103°–104°C in the case of very airtight packages.

In another process for conserving the product, a certain amount of sorbic acid with tartaric or citric acid added to it to modify the pH can be incorporated in the rehydration bath. Said process is authorized, but the amount of sorbic acid per kilogram is limited. Said process provides good conservation and is the most widely used at present. However, incorporation of said chemicals substantially impairs the flavour.

Alternatively dehydration of prunes can be limited to the level necessary for them to be fit for consumption, or 65 percent dry extract. Said process provides prunes with better taste qualities than the superdehydration process, but with the drawback of being difficult to keep.

In fact, during storage, it is impossible to use simple packagings, such as bags, as the prune is much softer than when it is more dehydrated. Such prunes can only be kept for a very short time. The fruit has, therefore, to be put into airtight packages and sterilized by heat. In any case, such heat sterilisation, which involves a more costly outlay on materials, is compulsory in this case, as it is impossible to incorporate in the prunes the chemicals preserving agents which can be used in rehydration baths with superdehydrated prunes.

Owing to these drawbacks, the above-mentioned process, which was the first used in the prior art, has now practically been abandoned owing to the increase in crop yields and the quantities to be stored and treated.

There are, therefore, many drawbacks to the processes now in use, both on the technical level and that of the quality of the product obtained. Among the main technical drawbacks the following may be mentioned:

The necessity of very heavy financial outlays owing to the high cost of the dehydration equipment required to treat an entire crop in about 2 months. This drawback is increased by the fact of superdehydration, which necessitates the fruit staying longer in the tunnels, and consequently, even larger installations.

The necessity of immediate treatment, and consequently the risk of losing a large part of the crop, in the case of atmospheric disturbances (wind, storm) which cause fruit to fall, owing to the impossibility of dehydrating the plums or preserving them in the time available.

Drawbacks due to a rainy season: in this case the fruit has a relatively low dry extract content, which may be as low as 15–16 percent; it is therefore more difficult to dry. The finished product has a mediocre taste (excessive acidity) and a very bad weight yield. The prune is small compared to the starting material and is consequently expensive for a finished product with a substantially lower commercial value.

Qualitatively speaking, the fact of dehydrating a plum to a very marked extent to obtain a prune results in small or medium size prunes, only a small portion of which is edible, taking into account the stones they contain. Furthermore, superdehydration causes a prune to loose a lot of its flavor as it deprives the fruit of some of its taste and its essences, and slightly caramelizes the sugars, and then replaces its substances by water.

Finally, present day processes do not turn the raw material to the best account. Compared with the Ente plums treated, the amounts and size of the prunes obtained are very small and the cost of the successive operations of superdehydration and rehydration is very high compared with the value of the finished product. These processes, therefore, result in an expensive product.

The object of the present invention is a process for converting fruit into dried fruit under improved conditions with respect to the state of the art.

Another object of the invention is a process, enabling prunes to be obtained from varieties of plums which, up to now, were considered as being unsuitable to provide prunes having a quality and taste acceptable to the consumer.

Another object of the present invention is a process for treatming plums, such as the Ente plum, in order to obtain prunes, which does away with the drawbacks of the prior art.

Generally speaking, the invention therefore relates to a process for obtaining dried fruit, such as prunes, in which (a) the fruit is intimately contacted with an aqueous solution containing at least one sugar, the said contacting being repeatable with aqueous sugar solutions whose sugar content increases each time, until the sugar syrup replaces, at least partially, the cellular liquid of the fruit, the dry extract of the fruit thus being enriched and (b) the fruit enriched in this manner is dehydrated.

The process of the invention is applicable to all fruit which can be dried, notably to various varieties of plums such as the blue "Saint Antonin" plum and damsons, among others, as well as the Ente plum which has been mentioned hereinabove with respect to the prior art.

Fruit to be treated according to the new process is picked under the same conditions as fruit which it is intended to process according to the prior art. It is, however, possible to pick the fruit a little earlier, the point of maximum ripeness, and therefore the maximum dry extract content, not being imperative owing to the addition of sugar which is carried out according to the invention, and the advantage of obtaining a firmer fruit instead of a fruit softened by its being overripe.

The fruit should be prepared for the treatment. After picking, fruit is delivered to the factory and various conventional operations are carried out, such as: removal of stalks, washing in cold water in a fruit washer with aspersion after washing, placing it on a roller conveyor belt for sorting in order to remove defective fruit, and sizing.

After the sizing step the fruit is in a condition to be treated according to the new process.

The forms of embodiment of the process of the invention differ according to whether the treatment of the harvested, sized fruit is carried out immediately or delayed.

For immediate treatment, fresh fruit should first be subjected to a blanching step in order to soften the flesh of the fruit.

Said blanching consisting, for example, in placing the fruit in an apparatus provided with a steam heating system, covering it with water, raising the temperature slightly below boiling point for the time necessary to obtain the desired softening. Generally speaking, blanching times of a few seconds, such as 2 to 5 seconds, are suitable. The fruit is then cooled in a flow of cold water as quickly as possible. It is then strained.

In another embodiment, the fruit can be subjected to partial dehydration prior to treatment, for example by passing the fruit through a drying tunnel for a shorter or longer time according to the degree of dehydration desired. For example, for drying temperatures of about 50° to 60°C, periods of time of 1 to 2 h are suitable in order to obtain 10 to 20 percent dehydration.

This step is optional: it is not necessary to dehydrate fruit, such as plums, before applying the treatment to it. It may even be preferable to treat the fruit while it is fresh rather than slightly dehydrated fruit. The only advantage of this step is to enable the treatment of fresh fruit to be delayed, as slightly dehydrated fruit can be kept for two or three days.

According to still another embodiment, before the fruit is contacted with the sugar solution, the freshly picked fruit is subjected to a first, limited dehydration, the loss of weight induced by said dehydration not being greater than about 10 percent of the weight of the freshly picked fruit, after which the fruit is frozen, using known means for cold storage. This variant can be advantageously applied to picked fruit which has been conserved for a relatively long time before being subjected to the treatment proper or limited enriching with sugar followed by dehydration.

According to the invention, deep freezing was found to constitute an excellent preserving treatment which has a beneficial influence on the taste quality and appearance of the final product, and that the said cold storage should necessarily be preceded by a slight dehydration of the fresh fruit.

This first partial, limited dehydration causes a loss in weight of less than 10 percent with respect to the fresh fruit, and advantageously of about 3 to 5 percent. It prevents the cells from bursting, which might occur if fruit whose cells had not been previously slightly dried were frozen.

When the process of the invention is applied to the Ente plum, or other oblong, mauve plums, said first dehydration also makes it perfectly possible to obtain the typical black prune, owing to the enzymatic darkening which it causes on the surface of the fruit. Said dehydration also slightly alters the flavor of the Ente plum, giving it a flavor approaching the characteristic prune taste.

Freezing is carried out by the conventional deep freezing technique. Generally speaking, the fruit is maintained at a temperature of approximately −18°C. It should be noted that fruit which is to be subjected to freezing, and having undergone partial dehydration, should cool to ambient temperature following the first dehydration. When it reaches normal temperature it can be placed in the freezing tunnel.

When treatment is to be delayed, the invention also proposes conserving freshly picked fruit, such as plums, by immersing it in an aqueous solution of sulphur dioxide of sufficiently high concentration to prevent any fermentation and ensure very long conservation. In general, concentrations of at least 1 g/l, and notably from 1 g/l to 1.30 g/l $SO_2$ are suitable.

This preserving can be carried out in tanks of cement, or a material sold under the name of "Everite" the interiors of which are vitrified or plasticized. Fruit so treated can be kept for a very long time; it is only necessary to periodically analyze the sulphur dioxide content of the bath and, if necessary, adjust it to the value originally selected, which should remain substantially constant.

When fruit so preserved is subjected to the process of the invention it should undergo an operation known as desulphurization during which it is cleansed of all traces of the sulphur dioxide with which it was in contact during the preconserving period. Various methods can be used for this. According to one form of embodiment, the fruit in its bath of sulphur dioxide solution is heated to a temperature of approximately 80°-85°C, thus causing evaporation of the sulphur dioxide. As a variant, the $SO_2$ solution containing the fruit is subjected to a vacuum at moderate temperature. For example, the fruit in its sulphur dioxide bath is placed under a vacuum bell jar. The temperature of the liquid should be maintained at about 45° to 55°C, and the vacuum can be progressively lowered to 500 mm of mercury. This vacuum desulphurizing step gives the advantage of working at moderate temperatures and it would appear to put the cells of the fruit into the most favorable state for the subsequent treatment.

Fruit so softened, either by blanching or by the desulphurization step, or with no other preparation in the case of fruit which has undergone slight dehydration and which is therefore softened, is placed in vessels, which may be the same as those used for sulphur dioxide preservation, and is subjected to step (a) of the process of the invention, which may be called fruit sugaring. Similarly, fruit preserved by freezing, or which has just been picked, is subjected to sugar enriching treatment. During the operation, fruit which has been subjected to the fruit dehydration should not be placed in the enriching baths before having been completely cooled, so that darkening has time to take place. Generally speaking, an aqueous syrup containing at least one sugar which is contacted with the fruit is used.

Sucrose, glucose, dextrose, inverted sugar and any other type of sweetening product, singly or in combination can be used as sugar. The essential characteristic of the sweetening product is that it should be capable of increasing the dry extract of the fruit by osmosis.

According to one embodiment, sugaring consists in covering the fruit with a syrup consisting of sucrose in solution in water with glucose or dextrose syrup, or inverted sugar added thereto. The addition of glucose or dextrose, which are low molecular weight sugars, facilitates penetration into the fruit. As the sweet taste of glucoses and dextroses is not so strong as that of sucrose, the amounts of them in the mixture is a factor which influences the taste of the finished product. Thus, for the same amount of sucrose, an increase in the amount of glucose or dextrose tends to give a less sweet tasting dried fruit.

The relative proportions of sucrose with respect to glucose or dextrose are advantageously from 60 to 70 parts by weight of sucrose for 30 to 40 parts by weight of the other sugars.

The concentration of the starting sweetened aqueous solution or syrup can notably vary from 30 to 50 percent by weight according to the dry extract content of the fresh fruit. With a syrup containing 70 parts sucrose for 30 parts glucose or for 30 parts dextrose, the total concentration can be approximately 40 percent of dry extract. Such syrups are suitable to be poured over the plums in the sugaring vessels at a temperature slightly below 100°C.

When the sugaring vessels have been filled they must be placed in a heated oven or tunnel where they remain for several hours. Generally speaking, a period of 10 to 15 hours at a temperature of no higher than about 80°C is suited to the requirements of the invention.

Depending on whether fruit with a more or less high level of dry extract is desired, the sugaring step, followed by that of putting the fruit in the oven, should be repeated using a syrup with a higher sucrose and glucose content at each step.

For example, if it is desired to increase the dry extract content of the fruit, a syrup at 40 percent concentration as defined above can first be used, the operation then being carried out again with a syrup at a concentration of 55 percent, and additional sugaring can even be carried out with a 65 percent syrup.

According to the invention, it was found that, in the manufacture of plums or prunes by the enriching process, the dry extract content of the fruit flesh which appears to be the most suitable both from the point of view of taste and economy is at least 40 percent dry extract. In other words, in the case of plums having a mean dry extract content of 20 percent when fresh, at least 200 g of sugar or pure glucose will be incorporated per kilogram of fresh plums. During enriching, flavorings and organic acids for strengthening, modifying or changing the taste of the finished product can be added to the syrup, as well as pectic products for modifying its firmness.

These sweetening substances are incorporated by the phenomenon of osmosis. The cellular liquid of the fruit is partially replaced by the sugar syrup.

In practice, two enriching techniques can be used.

The first consists in placing directly in the enriching bath fruit which has undergone a first dehydration, or fruit preserved in a freezing chamber and which is used without being previously unfrozen. Generally speaking, enriching baths are at this stage at a temperature below about 60°C, at 50°C for instance. When frozen fruit is put into them they cool down, and this cooling must be compensated as rapidly as possible by supplying external heat in order to obtain the temperature of the baths at about 55°C.

The second enriching procedure is only used for frozen fruit. It consists in pricking the frozen fruit fairly deeply with fine, perforating needles. This treatment is carried out in a pricking machine. The advantage of this operation is that it substantially shortens the time required for enriching and provides more homogeneous enriching. However, the finished fruit, i.e. the dried fruit, obtained by this technique is less shiny.

It has also been found that the temperature of enriching baths should advantageously be maintained, at the start of the sugaring process, at a level of no higher than about 60°C, at 55°C for instance. A higher temperature is more effective for rapid enriching, but it may result in a caramelization which alters and deteriorates the taste of the finished product.

In the enriching baths, the dry extract content of the plums should preferably be raised to a level of 50 to 55 percent. For this, the enriching baths should preferably have a dry extract content at the start about 5 percent higher than the dry extract content of the fruit when it comes from the first dehydration step.

During enriching, the dry extract content of the enriching syrup is increased progressively to a level of 55 to 60 percent. From this point of view, the concentration of the syrup follows the increase in the dry extract of the fruit itself in a controlled manner. Preferably, a difference of about 5 percent is maintained between the levels of dry extract in the fruit and the concentration of the syrup, which permits homogeneous enriching to be obtained.

In step (b) according to the process of the invention, the enriched fruit is dehydrated after having been removed from the enriching bath, and optionally rinsed. Said dehydration steps can be carried out by known means, but their application in the process of the invention is very advantageous. When the fruit is removed from the enriching bath it is rinsed in water, preferably tepid water, in order to cleanse it of the syrup which sticks to the skin of the fruit by capillary attraction. After this washing, the fruit is subjected to a second dehydration.

Once the fruit has been removed from the enriching bath and strained it can be disposed in single layers on wire trays and placed in the dehydration tunnel as has already been described for fruit treated in the prior art.

The enriched fruit is treated by the dehydration process used in the prior art, but, taking account the high sugar content of the enriched fruit, it remains in the tunnel for a much shorter length of time (about one third of the time necessary in the prior art).

It is unnecessary to raise the temperature in the tunnel as high as in the old process: temperatures of 55° to 65°C, for instance, are suitable. In this way any caramelization of the fruit is avoided and the taste qualities of the fruit are respected.

For this process an oven with pulsed air of the same type as that used for the first dehydration, can be used. During said second dehydration the level of dry extract of the fruit rises from about 50 percent, the level obtaining when it is removed from the bath, to about 65 percent, which is the dry extract content of enriched fruit. Said treatment in a dehydration oven is carried out for a period of time depending on the gauge size of the fruit. As has been previously stated, the temperature in the oven preferably does not rise higher than about 60°C. Under these conditions, the dehydration time can vary from 2 to 6 hours. Control of the moisture content of the air circulating in the oven is also recommended, the air being maintained sufficiently moist to prevent surface hardening of the skin of the fruit. Generally speaking a moisture content of about 70 percent is maintained in the oven at the start, decreasing progressively to 25 percent.

The dehydration step is carried out when the fruit is intented to be put on the market, the dry extract level to be obtained can be maintained at a limited value, in the order of 65 percent for instance. This value is only given by way of example, as the process of the invention permits fruit to be obtained with a highly variable dry extract content. It should be noted that, for low values of dry extract, the flesh of the fruit can be kept firm by the addition of pectic products to the enriching bath, as has been pointed out hereinabove. By maintaining the dry extract at a moderate level, at 65 percent for instance, superdehydration of 78/80 percent, which was required in the old process to ensure temporary preservation, is avoided. Said superdehydration being a factor in obtaining a finished product of substantially lower quality and a significant loss of substance, due to volatile substances being carried away in the last step of dehydration; caramelization of sugars, which causes a substantial loss of weight, and more especially deterioration of the taste quality of the product, is thus avoided.

Under the conditions described hereinabove, an enriched dried fruit is obtained. Thus, when the process is applied to Ente plums or damsons, the last dehydration makes the flesh of the fruit firmer and provides a black prune of characteristic flavor.

The advantages of the process of the invention are obvious when it is compared to the processes of the prior art. The following comparison is carried out on prunes obtained from Ente plums.

It is intended to place on the market a product with a dry extract content of about 65–66 percent by weight of the product.

In the prior art, the superdehydration process, or the simple dehydration process was used.

The simple dehydration process gives higher yields by weight and size due to the fact that there is no caramelisation and that less volatile substances are lost by dehydration than by the superdehydration process.

This difference will not be taken into account in the following comparison which does not take into consideration the modifications to said yields caused by the loss of said elements.

An Ente plum will be taken as an example; at its optimal degree of ripeness it weights 30g and 22 percent of its weight consists of dry materials. To raise it to 66 percent dry extract, it will be necessary to reduce its weight by two thirds by evaporation of the water it contains, and a prune weighting 10g with a dry extract content of 66 percent will be obtained, and consequently a gauge size of 50 prunes per one-half kilo.

If, in the present state of the market, a kilo of fresh plums is taken as costing Fr. 0.60/kg, a 30g plum is therefore worth Fr. 0.018. The starting material necessary to obtain 10 g of prunes costs Fr. 0.018; so the starting material used to obtain one kilogram of prunes will cost Fr. 1.80. Under these conditions, it will be necessary to process 3 kg of fresh Ente plums, to obtain 1 kg of prunes ready to eat and of a gauge size of 50 prunes per one-half kilo.

In the process of the invention, on the other hand, the fresh Ente plum, weighing 30g and containing 22 percent of its weight in dry matter is subjected to an enriching step consisting in the introduction of sugar.

As this incorporation occurs by osmosis, the plum will be maintained at a minimum weight of 30g; 18 percent of its weight in sugar will be incorporated into it, therefore 5.40g of sugar will be used.

An enriched plum weighing 30g and containing 40 percent of its weight of dry material is thus obtained.

This enriched plum will therefore cost Fr. 0.018 viz the price of 30g of fresh plums at Fr. 0.60/kg, plus Fr. 0.00594 (corresponding to 5.40g sucrose and glucose at Fr. 1.10/kg), or a total of Fr. 0.02394.

To obtain 65–66 percent dry materials, it will be necessary to reduce the enriched 30g plum by dehydration, to convert it into a prune weighing 18.46g.

Consequently, the gauge size of the prune obtained will be (500/18.46) = 27 prunes per ½ kilo.

The cost of the starting material necessary to obtain said prune of a gauge size of 27 per one-half kilo being Fr. 0.02394, the cost of the starting material necessary to produce one kilogram of these prunes will be:

(0.02394 × 1000)/18.46 = 1.29 or 0.02394 × 54 = 1.29, the figure 54 representing twice the gauge size of the half kilo.

Ente plums which, according to the prior art, gave prunes of a gauge size of 100 prunes per one-half kilo give, with the new process, prunes of a gauge size of 44 prunes per one-half kilo. In other words, with the invention, the range of gauge sizes is practically never lower than 50 prunes per one-half kilo, which corresponds at present to the gauge sizes which are most frequently sought by consumers.

Increasing the gauge size represents a very substantial increase in value of the finished product, and, at the same time, the process of the invention enables the cost of the materials used to be decreased by about 27 percent. The cost of treatment can be taken as being substantially the same in either process.

The figures given are theoretical. In reality, the gains in weight and gauge size are larger than said theoretical figures owing to the fact that losses of material occuring during superdehydration are not taken into account.

The process of the invention provides a substantial qualitative and commercial advantage as it permits various flavors to be easily incorporated into the prune to vary its taste if this should be desired. Furthermore, as the prunes are very much larger, they correspond better to the customers's taste.

In addition to said economical and commercial advantages, the technical advantages facilitate preservation at harvest time, and consequently prevent a partial loss of the crop in the case of bad weather, and permit treatment to be extended over the whole year. For this reason, the new process results in a very substantial saving on equipment, compared with the drying installations required to superdehydrate the entire crop in a few months.

Generally speaking the process described hereinabove can be summarized as the combination of two successive treatment steps: (a) enriching of fruit cells owing to the penetration into the said cells of at least one sugar, sweetening product or other substance permitting the dry extract of the fruit to be increased by osmosis.

(b) extraction of the water contained in the fruit cells.

The process thus combines enriching of the fruit and its dessication. It can be applied to all fruit which can provide dried fruit. In the case of Ente plums, the process provides a dried fruit which can be considered as being an enriched prune or an enriched Ente plum.

The process of the invention namely the dessication which follows sugar enrichment should be confused, with the straining drying process after sugar coating which follows preserving in the making of preserved fruits. It concerns two entirely different processes as dessication according to the invention produces a high concentration, a darkening and an organoleptic transformation especially for the prunes whereas the straining-drying after sugar-coating has only as a consequence to crystallize sugar on the surface of the fruit. Moreover, the dessication operation of the prunes according to the invention must be done in suitable installations to drying with strong ventilation at a high temperature of the pulsed air and regulation of the hygrometry of the air in the apparatus, whereas for the preserved fruit a short period of time in the open air is sufficient. In this latter case, it is not meant to be drying or dehydration as this step lasts only the necessary time for cryltallization of the sugared skin on the surface of the fruit.

The invention is further illustrated by a full example of the application of the process.

EXAMPLE

It has been operated on 5 000 kg of plums (Ente plums).

1. First dessication and freezing

After putting the plums on hurdles, the hurdles are then placed on the dehydration tunnel.

Passage time in the tunnel is of 2 hours as from the moment when the temperature has reached 60°C. The first hour hygrometry is maintained at 80 percent the second hour it is lowered to 65 percent.

Then the plums are taken off from the tunnel and stored in open air for about 4 hours in order to let them slowly get the ambiant temperature. The effect of this cooling would let oxygen reenter in the fruit cells and consequently would allow the enzymatic darkening reaction.

The fruits still on the hurdles are then passed in the freezing tunnel, tunnel with strong air ventilation at −30°C. One hour later the fruit is hard frozen, it is taken off from the freezing tunnel and these hurdles are emptied into big cases of 500 kg having inside polyethylene sheet, these cases representing warehouse containers and the handling of frozen fruits. The case operation filling of 500 kg is very easily done as the fruits are extremely hard once frozen and they do not risk crushing.

The net weight obtained after this first step is 4 835 kg, the dessication has been slightly above 3 percent.

After six months of storage at −18°, at the outlet of cold rooms, the net weight is no more than 4 770 kg. The loss of weight during warehousing at −18°C is about 1.50 percent.

2. Enrichment

The frozen fruits are directly placed in an enrichment bath.

a. checking of the average dry extract of the fruits. This checking is done with a refractometer, before enrichment and in order to determine the content of the first syrup to be applied.

The average of the checked samples gives 22, 15 percent of dry extract. A certain heterogenity appears, the minimum of dry extract value being 18 and the maximum 26. The syrup which constitutes the first bath will therefore correspond to 23 percent in order not to exceed 5 percent of difference with the less sugared fruits. This bath is established at a pH of 3,4 by addition of citric acid and said pH is maintained during all the duration of the enrichment. The syrup is prepared with pure saccharose.

b. the vat containing the bath in which the plums have been put are submitted to a rapid heating by injection of dry steam which permits a rapid increase of the temperature, and defreezing of fruits, under 50° C temperature, temperature not to be exceeded during said operation in order to avoid bursting of the fruits.

The vats thus heated are placed in ovens in which the ambient temperature is maintained at 60°C. The rising of the contents of syrups in the vats must be strictly watched. It is function of the rapidity of the penetration of sugar in the fruit cells. The difference between the dry extract of the fruit cells and that of the syrup must be maintained the nearest possible to 5 points. That is to say that after the first 24 hours which have produced with the starting syrup of lower sugar content, an homogenisation of the dry extract of the fruits, a checking is operated every 6 hours on the fruit and according to the degree of dry extract which appears with the sample checked the syrup is brought to 5 or 6 degrees greater than dry extract. Thus, if the sample gives 25 in the syrup, this latter will be brought at 30/31. Naturally at each sample the pH is checked and it is brought back after modification of the bath to 3.4 which is the pH desired.

In the example chosen after 125 hours the fruits in the baths have reached 47/48 percent of dry extract. They have been taken off the baths, put on hurdles and abundantly washed with hot water in order to free them from the syrup maintained on their surface by capillarity.

At the outlet of the enrichment baths and after washing, the net weight obtained is 4483 kg, this discrease of weight is due to a light dry up provoked by the osmotic osmose pressure.

3. Second dessication

The fruits thus enriched, put back on hurdles and washed, are placed in the drying tunnel (the same as for dehydration and freezing). The time of passage in this tunnel has been 2½ hours after obtaining a temperature of 60°C inside the tunnel. The hygrometry in the tunnel was for the first hour about 65 percent and was progressively reduced during the next 2½ hours to reach 50 percent.

At the outlet of the tunnel the plums are left in the air during the necessary time for their cooling, another enzymatic darkening is produced. Said darkening is lesser than with the first dehydration.

The hurdles are emptied, the plums are packaged, during the operation they have been put into cases of 12.5 kg. The net weight obtained has been 3424 kg which gives a yield of 1 kg of prunes per 1.46 kg of plums.

The degree of humidity of the fruits when packed is (average degree) 34.5 percent. This degree of humidity is checked with an electrical humidimeter, sole apparatus capable of giving the actual degree of humidity. As a matter of fact, the refractometer after cooling the plums and the effect of the pectins during this cooling does not permit in any case to measure the dry extract of the finished product.

After concentration of the baths and taking into account the residual sugar in the bath, the weight of the sugar absorbed by the fruits is 1190 kg i.e. 238 g per kg of plums.

The median size obtained for the prunes is 32 fruits per one-half kg.

It is to be noted that such a process must be applied in its whole in order to obtain a dried fruit comparable to the prune.

I claim:

1. A process for obtaining dried enriched prunes from plums comprising the steps of:
    I. partially dehydrating the plums at 60°C for 2 hours to obtain partially dehydrated plums;
    II. cooling the partially dehydrated plums for 4 hours in open air;
    III. freezing the cooled dehydrated plums with strong air ventilation at −30°C for 1 hour to obtain frozen plums;
    IV. immersing the frozen plums in a vat having 30–50 percent aqueous sugar syrup maintained at a pH of 3.4 by adding citric acid;
    V. rapidly heating the vat with dry steam to heat its contents to a temperature of 50°C;
    VI. placing the vat from Step V in an oven maintained at a temperature of 60°C for 125 hours to produce treated plums;
    VII. washing the treated plums with hot water to obtain enriched plums;
    VIII. drying the enriched plums at 60°C for 3.5 hours;
    IX. cooling the dried enriched plums from Step VIII in open air;
    wherein the drying and cooling steps of VIII and IX are continued until the degree of humidity in the enriched plums is 34.5 percent thus converting them into dried enriched prunes.

* * * * *